T. CULVER.
Process of Putting up Boneless Hams.

No. 202,239.        Patented April 9, 1878.

Witnesses.
Otto Hufeland
J. H. Wahlers

Inventor.
Tuttle Culver
by
Van Santvoord & Hauff
his attorneys

UNITED STATES PATENT OFFICE.

TUTTLE CULVER, OF NEW YORK, N. Y.

IMPROVEMENT IN PROCESSES FOR PUTTING UP BONELESS HAMS.

Specification forming part of Letters Patent No. 202,239, dated April 9, 1878; application filed March 13, 1878.

*To all whom it may concern:*

Be it known that I, TUTTLE CULVER, of the city, county, and State of New York, have invented a new and Improved Mode of Putting Up Boneless Hams, of which the following is a specification:

This invention relates to a new and improved mode of putting up boneless hams for the market and for domestic use; and the same consists in passing around the ham, after the bone has been removed, a series of transverse loops of cord, which are made to intersect with a vertical loop embracing the sides of the ham, and which are knotted or tied together in such a manner that the ham can be cut from either end without destroying the integrity of the binding medium existing around the remaining portions of the ham.

Figure 1:
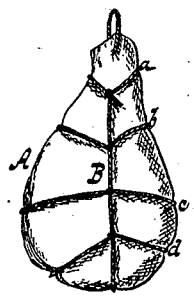
Figure 2:

In the drawing, Figure 1 represents a side elevation of the ham from which the bone has been removed, the same being bound by a cord under my mode of putting up hams for the market and domestic purposes. Fig. 2 is a longitudinal section thereof.

In extracting the bone from hams it is necessary to sever the meat to some extent, and afterward give it a compact form, corresponding as nearly as possible to the original shape; but it has been found that the severed portions are liable to fall apart when the ham is cut by the consumer or others, causing it to lose its compact form, and rendering it almost impossible to cut it into slices.

To overcome these objections is the object of my invention, as will hereinafter more fully appear.

The letter A represents a ham from which the bone has been removed in the ordinary manner, and B a binding-cord surrounding the same, which is arranged substantially as shown. This binding consists of a series of transverse loops, which are made to pass around the ham, and are united by means of a vertical loop, embracing the sides of the ham.

Said loops may be constructed of a series of cords, but are preferably formed of a single cord, in a manner about as follows: A small loop, $a$, is formed at one end of the cord, and the other end of the cord is passed through the end, forming a larger loop, or what is commonly known as a "slip-knot." The said loop $a$ is then passed around the smaller end of the ham, and is tightened thereon by drawing the cord downwardly toward the larger end. The cord is then drawn around the ham and formed into a loop, $b$, and is knotted or tied, and again drawn downwardly, and passed around the ham and looped, as at $c$, and is again knotted or tied, as before, and finally looped around the ham, as shown at $d$, and knotted, the cord being then passed over the end of the ham and successively knotted or tied to the opposite sides of the loops $d\ c\ b\ a$, which completes and forms an effectual binding medium.

It will be perceived that, in the mode of putting up and binding boneless hams above described, in forming the binding the cords are so knotted or tied together that the ham can be cut from either end; that portion alone between two of the loops will become unbound, leaving the binding integrity of the remaining portions intact; and that the same serve to retain the ham in substantially its original shape until the entire ham is consumed, and prevent it from falling to pieces as soon as the cord is cut at a single point, as would be the case if the cord was simply wrapped or bound around the article, or if the article was incased in a net.

It will be seen that, when the binding medium has been properly applied upon a ham from which the bone has been removed, the ham will be made to assume substantially its original compact form, and will not become disunited during handling or shipping of the same.

Having thus fully described my invention, what I claim, and desire to secure by Letters Patent, is—

The mode, substantially as herein described, of putting up boneless ham for the market and for domestic use, the same consisting in passing around the ham a series of transverse loops of cord, which are made to intersect with a vertical loop embracing the sides of the ham, and knotted or tied together, whereby the ham can be cut from either end without destroying the integrity of the binding medium existing around the remaining portions of the ham, as set forth.

In testimony that I claim the foregoing I have hereunto set my hand and seal this 5th day of March, 1878.

TUTTLE CULVER. [L. S.]

Witnesses:
   J. VAN SANTVOORD,
   E. F. KASTENHUBER.